US012794592B2

(12) United States Patent
Asterjadhi et al.

(10) Patent No.: US 12,794,592 B2
(45) Date of Patent: Nov. 10, 2026

(54) NEGATIVE ACKNOWLEDGMENT MECHANISMS

(71) Applicant: QUALCOMM Incorporated, San Diego, CA (US)

(72) Inventors: Alfred Asterjadhi, San Diego, CA (US); Abhishek Pramod Patil, San Diego, CA (US); George Cherian, San Diego, CA (US); Gaurang Naik, San Diego, CA (US); Sai Yiu Duncan Ho, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 419 days.

(21) Appl. No.: 18/506,996

(22) Filed: Nov. 10, 2023

(65) Prior Publication Data

US 2025/0158748 A1 May 15, 2025

(51) Int. Cl.
*H04L 1/1607* (2023.01)

(52) U.S. Cl.
CPC .................................. *H04L 1/1607* (2013.01)

(58) Field of Classification Search
CPC ..................................................... H04L 1/1607
See application file for complete search history.

(56) References Cited

U.S. PATENT DOCUMENTS

| | | | |
|---|---|---|---|
| 8,054,813 B2 | 11/2011 | Kim et al. | |
| 9,887,821 B2 | 2/2018 | Seok | |
| 10,432,381 B2 | 10/2019 | Kim et al. | |
| 10,484,159 B2 | 11/2019 | Asterjadhi et al. | |
| 2017/0366321 A1* | 12/2017 | Kim | H04L 1/1614 |
| 2018/0103487 A1* | 4/2018 | Asterjadhi | H04W 24/02 |
| 2021/0006361 A1* | 1/2021 | Asterjadhi | H04W 74/0816 |
| 2021/0044389 A1* | 2/2021 | Kim | H04L 5/0055 |
| 2021/0099256 A1* | 4/2021 | Lee | H04L 1/1893 |
| 2021/0235486 A1* | 7/2021 | Atefi | H04W 74/002 |
| 2022/0231797 A1 | 7/2022 | Song et al. | |
| 2024/0147531 A1* | 5/2024 | Ryu | H04W 74/0816 |
| 2025/0081237 A1* | 3/2025 | Di Taranto | H04W 72/541 |
| 2025/0203591 A1* | 6/2025 | Lu | H04W 72/1263 |
| 2025/0373713 A1* | 12/2025 | Baykas | H04L 1/1607 |

OTHER PUBLICATIONS

Partial International Search Report—PCT/US2024/048170—ISA/EPO—Dec. 10, 2024.
"IEEE Draft Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications", IEEE P802.11-REVme/D4.0, Aug. 2023, pp. 1-5822.
International Search Report and Written Opinion—PCT/US2024/048170—ISA/EPO—Jan. 17, 2025.

* cited by examiner

*Primary Examiner* — Deepa Belur
(74) *Attorney, Agent, or Firm* — Patterson & Sheridan LLP

(57) ABSTRACT

This disclosure provides methods, components, devices and systems that may help various wireless devices negatively acknowledge certain wireless transmissions. An example method, performed at a first wireless node, generally includes obtaining information indicating transmission, from a second wireless node, of a physical layer (PHY) protocol data unit (PPDU) intended for the first wireless node, generating a frame indicating negative acknowledgment of at least a portion of the PPDU if one or more conditions are met, and outputting the frame to the second wireless node.

26 Claims, 9 Drawing Sheets

NEGATIVE ACKNOWLEDGMENT MECHANISMS

TECHNICAL FIELD

This disclosure relates generally to wireless communication, and more specifically, to signaling mechanisms for providing negative acknowledgment of certain types of transmissions in a wireless medium.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication by a wireless node/wireless station/wireless access point/wireless communication device. One aspect provides a method for wireless communications, related to mechanisms for negatively acknowledging certain wireless transmissions. The method generally includes obtaining information indicating transmission, from a second wireless node, of a physical layer (PHY) protocol data unit (PPDU) intended for the first wireless node, generating a frame indicating negative acknowledgment of at least a portion of the PPDU if one or more conditions are met, and outputting the frame to the second wireless node.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

The appended figures depict certain features of the various aspects described herein and are not to be considered limiting of the scope of this disclosure.

Like reference numbers and designations in the various drawings indicate like elements.

DETAILED DESCRIPTION

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), orthogonal frequency division multiplexing (OFDM), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO (MU-MIMO). The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Figure 2:
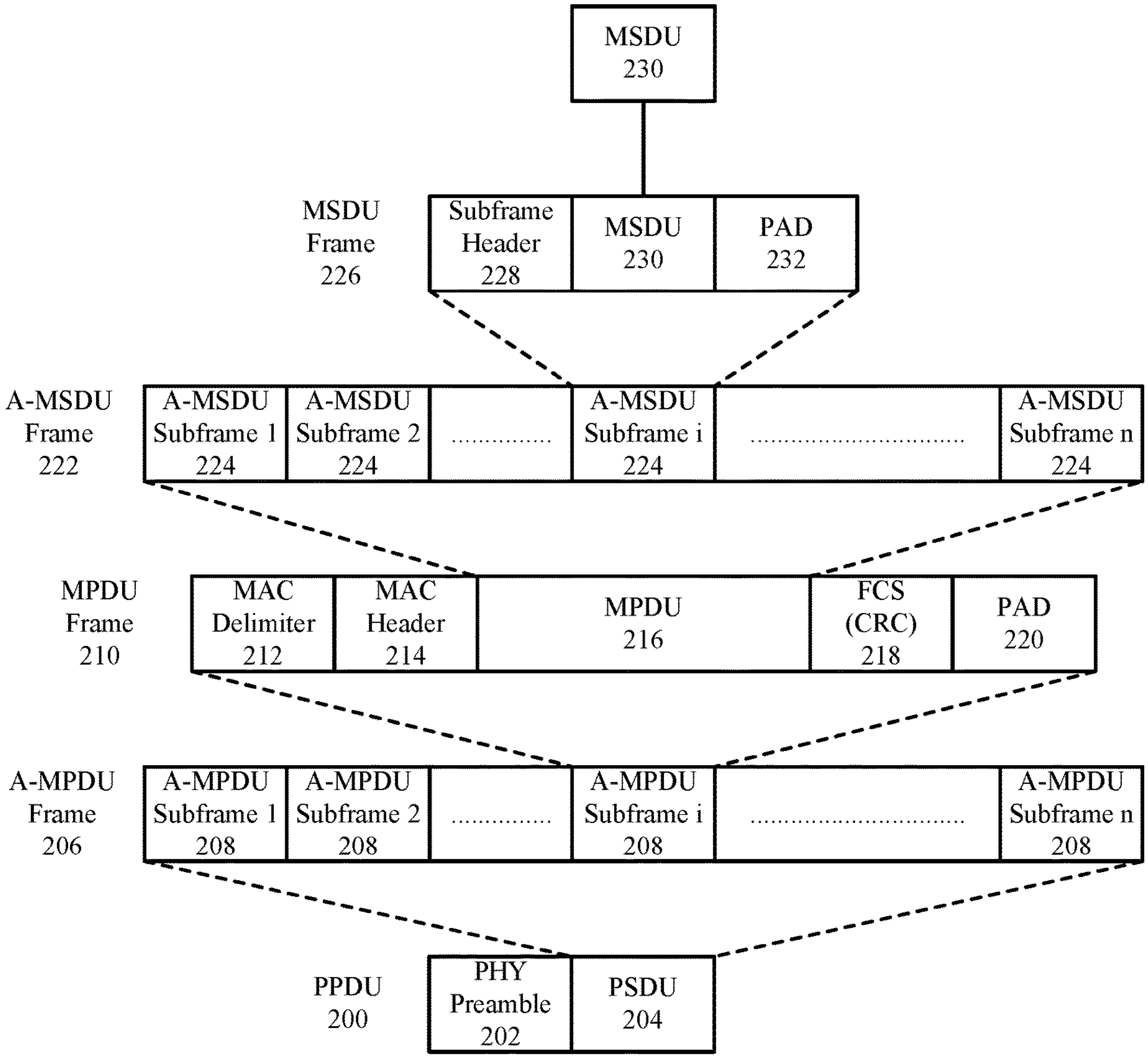
FIG. 2 shows a hierarchical format of an example PPDU usable for communications between a wireless AP and one or more wireless STAs.

Certain wireless systems utilize a hierarchical data structure where a single transmission carries multiple smaller data units. For example, FIG. 2 depicts a hierarchical format of an example physical layer (PHY) protocol data unit (PPDU) usable for communications between a wireless access point (AP) and one or more wireless stations (STAs). As described, each PPDU 200 includes a PHY preamble 202 and a PSDU 204. Each PSDU 204 may represent (or "carry") one or more MAC protocol data units (MPDUs) 216.

A receiving device may provide positive acknowledgment indicating successful reception of one or more MPDUs via mechanisms referred to as acknowledgment and block acknowledgment (BA). These mechanisms may use various frames, such as Ack, BlockAck (BA), Multi-STA BlockAck (M-BA) frames, to provide receive status of the MPDU(s). Focusing on the BA mechanism, a BA frame that is sent in response, typically includes one or more bitmaps with bits indicating whether a corresponding MPDU was successfully received. A transmitter receiving a BA may, thus, know which MPDUs should be re-transmitted.

One potential drawback for systems that utilize such a PPDU structure is a lack of a signaling mechanism (e.g., protocol) to provide a negative acknowledgement (NACK) of the contents of the PPDU. In other words, what may be lacking is signaling that acknowledges the reception of the PPDU (e.g., via detection or partial decoding the PHY header) but a lack of reception of the contents of one or more of the PSDUs (PHY layer service data units) contained in the PPDU. The ability to signal a NACK for the PPDU might be beneficial, even when none of the MPDUs conveyed therein (in the PSDUs) are successfully received. For example, a NACK for a PPDU may provide feedback to a transmitter, allowing the transmitter to adjust transmit parameters for subsequent transmissions. For example, a NACK may provide immediate feedback regarding channel conditions or interference experienced by the receiver.

Aspects of the present disclosure provide a signaling mechanism allowing a receiver to provide NACK feedback of/for a PPDU. As will be described in greater detail below, based on the feedback, a transmitter may be able to adjust transmit parameters for a subsequent PPDU that might contain retransmission of MPDUs contained in a NACK'd PPDU. In some cases, a NACK may be provided in a frame that also includes suggested adjustments to transmit parameters, such as bandwidth, transmit power, a number of spatial streams (NSS), and/or a modulation and coding scheme (MCS) to use for the subsequent PPDUs.

Particular aspects of the subject matter described in this disclosure can be implemented to realize one or more of the following potential advantages. In some examples, the described techniques can be used to provide NACK feedback for a PPDU when only a portion of the PPDU is successfully decoded at a receiver, without successfully decoding any of the MPDUs contained in one or more of the PSDUs in the PPDU. The feedback may be used to adjust transmit parameters and, in some cases, the feedback may include suggested adjustments and/or statistics that can be used to adjust transmit parameters (e.g., target RSSI, interference levels, subchannel availability, and/or other such metrics). As a result, the signaling mechanisms provided herein may allow for efficient adaptation to channel conditions, which may help improve reliability and throughput, resulting in improved overall user experience.

Figure 1:
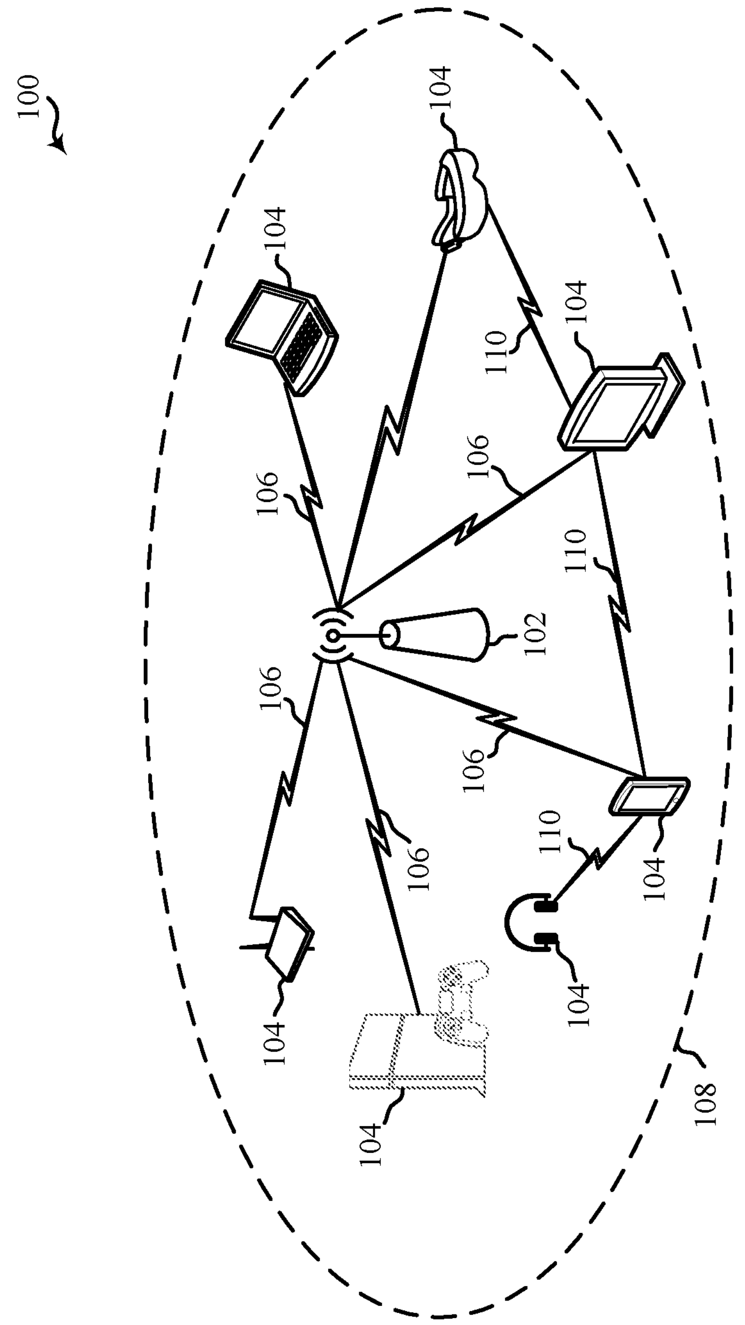
FIG. 1 shows a pictorial diagram of an example wireless communication network.

FIG. 1 shows a pictorial diagram of an example wireless communication network 100. According to some aspects, the wireless communication network 100 can be an example of a wireless local area network (WLAN) such as a Wi-Fi network. For example, the wireless communication network 100 can be a network implementing at least one of the IEEE 802.11 family of wireless communication protocol standards (such as defined by the IEEE 802.11-2020 specification or amendments thereof including, but not limited to, 802.11ay, 802.11ax, 802.11az, 802.11ba, 802.11bd, 802.11be, 802.11bf, and 802.11bn). In some other examples, the wireless communication network 100 can be an example of a cellular radio access network (RAN), such as a 5G or 6G RAN that implements one or more cellular protocols such as those specified in one or more 3GPP standards. In some other examples, the wireless communication network 100 can include a WLAN that functions in an interoperable or converged manner with one or more cellular RANs to provide greater or enhanced network coverage to wireless communication devices within the wireless communication network 100 or to enable such devices to connect to a cellular network's core, such as to access the network management capabilities and functionality offered by the cellular network core.

The wireless communication network 100 may include numerous wireless communication devices including at least one wireless access point (AP) 102 and any number of wireless stations (STAs) 104. While only one AP 102 is shown in FIG. 1, the wireless communication network 100 can include multiple APs 102. The AP 102 can be or represent various different types of network entities including, but not limited to, a home networking AP, an enterprise-level AP, a single-frequency AP, a dual-band simultaneous (DBS) AP, a tri-band simultaneous (TBS) AP, a standalone AP, a non-standalone AP, a software-enabled AP (soft AP), and a multi-link AP (also referred to as an AP multi-link device (MLD)), as well as cellular (such as 3GPP, 4G LTE, 5G or 6G) base stations or other cellular network nodes such as a Node B, an evolved Node B (eNB), a gNB, a transmission reception point (TRP) or another type of device or equipment included in a radio access network (RAN), including Open-RAN (O-RAN) network entities, such as a central unit (CU), a distributed unit (DU) or a radio unit (RU).

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, other handheld or wearable communication devices, netbooks, notebook computers, tablet computers, laptops, Chromebooks, augmented reality (AR), virtual reality (VR), mixed reality (MR) or extended reality (XR) wireless headsets or other peripheral devices, wireless earbuds, other wearable devices, display devices (for example, TVs, computer monitors or video gaming consoles), video game controllers, navigation systems, music or other audio or stereo devices, remote control devices, printers, kitchen appliances (including smart refrigerators) or other household appliances, key fobs (for example, for passive keyless entry and start (PKES) systems), Internet of Things (IoT) devices, and vehicles, among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the wireless communication network 100. The BSS may be identified by STAs 104 and other devices by a service set identifier (SSID), as well as a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function (TSF) for establishing or maintaining timing synchronization with the AP 102. The AP 102 may provide access to external networks to various STAs 104 in the wireless communication network 100 via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ, 45 GHz, or 60 GHz bands). To perform passive scanning, a STA 104 listens for beacons, which are transmitted by respective APs 102 at periodic time intervals referred to as target beacon transmission times (TBTTs). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The selected AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. For example, the wireless communication network 100 may be connected to a wired or wireless distribution system that may enable multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad-hoc network (or wireless ad-hoc network). Ad-hoc networks may alternatively be referred to as mesh networks or peer-to-peer (P2P) networks. In some cases, ad-hoc networks may be implemented within a larger network such as the wireless communication network 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad-hoc system, one or more of the STAs 104 may assume the role filled by the AP 102 in a BSS. Such a STA 104 may be referred to as a group owner (GO) and may coordinate transmissions within the ad-hoc network. Examples of direct wireless communication links 110 include Wi-Fi Direct connections, connections established by using a Wi-Fi Tunneled Direct Link Setup (TDLS) link, and other P2P group connections.

In some networks, the AP 102 or the STAs 104, or both, may support applications associated with high throughput or low-latency requirements, or may provide lossless audio to one or more other devices. For example, the AP 102 or the STAs 104 may support applications and use cases associated with ultra-low-latency (ULL), such as ULL gaming, or streaming lossless audio and video to one or more personal audio devices (such as peripheral devices) or AR/VR/MR/XR headset devices. In scenarios in which a user uses two or more peripheral devices, the AP 102 or the STAs 104 may support an extended personal audio network enabling communication with the two or more peripheral devices. Additionally, the AP 102 and STAs 104 may support additional ULL applications such as cloud-based applications (such as VR cloud gaming) that have ULL and high throughput requirements.

As indicated above, in some implementations, the AP 102 and the STAs 104 may function and communicate (via the respective communication links 106) according to one or more of the IEEE 802.11 family of wireless communication protocol standards. These standards define the WLAN radio and baseband protocols for the physical (PHY) and MAC layers. The AP 102 and STAs 104 transmit and receive wireless communications (hereinafter also referred to as "Wi-Fi communications" or "wireless packets") to and from one another in the form of PHY protocol data units (PPDUs).

Each PPDU is a composite structure that includes a PHY preamble and a payload that is in the form of a PHY service data unit (PSDU). The information provided in the preamble may be used by a receiving device to decode the subsequent data in the PSDU. In instances in which a PPDU is transmitted over a bonded or wideband channel, the preamble fields may be duplicated and transmitted in each of multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 wireless communication protocol to be used to transmit the payload.

The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ, 5 GHZ, 6 GHz, 45 GHZ, and 60 GHz bands. Some examples of the APs 102 and STAs 104 described herein also may communicate in other frequency bands that may support licensed or unlicensed communications. For example, the APs 102 or STAs 104, or both, also may be capable of communicating over licensed operating bands, where multiple operators may have respective licenses to operate in the same or overlapping frequency ranges. Such licensed operating bands may map to or be associated with frequency range designations of FR1 (410 MHz-7.125 GHZ), FR2 (24.25 GHz-52.6 GHz), FR3 (7.125 GHz-24.25 GHZ), FR4a or FR4-1 (52.6 GHz-71 GHz), FR4 (52.6 GHz-114.25 GHZ), and FR5 (114.25 GHz-300 GHz).

Each of the frequency bands may include multiple sub-bands and frequency channels (also referred to as subchannels). For example, PPDUs conforming to the IEEE 802.11n, 802.11ac, 802.11ax, 802.11be and 802.11bn standard amendments may be transmitted over one or more of the 2.4 GHz, 5 GHZ, or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 MHz, 240 MHZ, 320 MHz, 480 MHz, or 640 MHz by bonding together multiple 20 MHz channels.

In some examples, the AP 102 or the STAs 104 of the WLAN 100 may implement Extremely High Throughput (EHT) or other features compliant with current and future generations of the IEEE 802.11 family of wireless communication protocol standards (such as the IEEE 802.11be and 802.11bn standard amendments) to provide additional capabilities over other previous systems (for example, High Efficiency (HE) systems or other legacy systems). For example, the IEEE 802.11be standard amendment introduced 320 MHz channels, which are twice as wide as those possible with the IEEE 802.11ax standard amendment. Accordingly, the AP 102 or the STAs 104 may use 320 MHz channels enabling double the throughput and network capacity, as well as providing rate versus range gains at high data rates due to linear bandwidth versus log SNR trade-off. EHT and newer wireless communication protocols (such as the protocols referred to as or associated with the IEEE 802.11bn standard amendment) may support flexible operating bandwidth enhancements, such as broadened operating bandwidths relative to legacy operating bandwidths or more granular operation relative to legacy operation. For example, an EHT system may allow communications spanning operating bandwidths of 20 MHz, 40 MHz, 80 MHz, 160 MHz, 240 MHz, and 320 MHz. EHT systems may support multiple bandwidth modes such as a contiguous 240 MHz bandwidth mode, a contiguous 320 MHz bandwidth mode, a noncontiguous 160+160 MHz bandwidth mode, or a noncontiguous 80+80+80+80 (or "4×80") MHz bandwidth mode.

In some examples in which a wireless communication device (such as the AP 102 or the STA 104) operates in a contiguous 320 MHz bandwidth mode or a 160+160 MHz bandwidth mode, signals for transmission may be generated by two different transmit chains of the wireless communication device each having or associated with a bandwidth of 160 MHz (and each coupled to a different power amplifier). In some other examples, two transmit chains can be used to support a 240 MHz/160+80 MHz bandwidth mode by puncturing 320 MHz/160+160 MHz bandwidth modes with one or more 80 MHz subchannels. For example, signals for transmission may be generated by two different transmit chains of the wireless communication device each having a bandwidth of 160 MHz with one of the transmit chains outputting a signal having an 80 MHz subchannel punctured therein. In some other examples in which the wireless communication device may operate in a contiguous 240 MHz bandwidth mode, or a noncontiguous 160+80 MHz bandwidth mode, the signals for transmission may be generated by three different transmit chains of the wireless communication device, each having a bandwidth of 80 MHz. In some other examples, signals for transmission may be generated by four or more different transmit chains of the wireless communication device, each having a bandwidth of 80 MHz.

In noncontiguous examples, the operating bandwidth may span one or more disparate sub-channel sets. For example, the 320 MHz bandwidth may be contiguous and located in the same 6 GHz band or noncontiguous and located in different bands or regions within a band (such as partly in the 5 GHz band and partly in the 6 GHz band).

In some examples, the AP 102 or the STA 104 may benefit from operability enhancements associated with EHT and newer generations of the IEEE 802.11 family of wireless communication protocol standards. For example, the AP 102 or the STA 104 attempting to gain access to the wireless medium of WLAN 100 may perform techniques (which may include modifications to existing rules, structure, or signaling implemented for legacy systems) such as clear channel assessment (CCA) operation based on EHT enhancements such as increased bandwidth, puncturing, or refinements to carrier sensing and signal reporting mechanisms.

FIG. 2 shows a hierarchical format of an example PPDU usable for communications between a wireless AP 102 and one or more wireless STAs 104. As described, each PPDU 200 includes a PHY preamble 202 and a PSDU 204. Each PSDU 204 may represent (or "carry") one or more MAC protocol data units (MPDUs) 216. For example, each PSDU 204 may carry an aggregated MPDU (A-MPDU) 206 that includes an aggregation of multiple A-MPDU subframes 208. Each A-MPDU subframe 206 may include an MPDU frame 210 that includes a MAC delimiter 212 and a MAC header 214 prior to the accompanying MPDU 216, which includes the data portion ("payload" or "frame body") of the MPDU frame 210. Each MPDU frame 210 also may include a frame check sequence (FCS) field 218 for error detection (for example, the FCS field may include a cyclic redundancy check (CRC)) and padding bits 220. The MPDU 216 may carry one or more MAC service data units (MSDUs) 216. For example, the MPDU 216 may carry an aggregated MSDU (A-MSDU) 222 including multiple A-MSDU subframes 224. Each A-MSDU subframe 224 contains a corresponding MSDU 230 preceded by a subframe header 228 and in some cases followed by padding bits 232.

Referring back to the MPDU frame 210, the MAC delimiter 212 may serve as a marker of the start of the associated MPDU 216 and indicate the length of the associated MPDU 216. The MAC header 214 may include multiple fields containing information that defines or indicates characteristics or attributes of data encapsulated within the frame body 216. The MAC header 214 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 214 also includes one or more fields indicating addresses for the data encapsulated within the frame body 216. For example, the MAC header 214 may include a combination of a source address, a transmitter address, a receiver address or a destination address. The MAC header 214 may further include a frame control field containing control information. The frame control field may specify a frame type, for example, a data frame, a control frame, or a management frame.

Aspects Related to Negative Acknowledgment Signaling Mechanisms

Aspects of the present disclosure provide a signaling mechanism allowing a receiver to provide NACK feedback of/for certain wireless transmissions, such as a PPDU.

Certain wireless systems utilize hierarchical data structures, such as the PPDU structure depicted in FIG. 2, where the PPDU may contain one or more PSDUs or a multi user (MU) PPDU case where each PSDU contains one or more A-MPDU subframes. A receiving device may provide positive acknowledgment indicating successful reception of one or more MPDUs via a mechanism referred to as a block acknowledgment (BA). A BA typically includes a field that provides a bit indicating whether a corresponding MPDU was successfully received. A transmitter receiving a BA may, thus, know which MPDUs should be re-transmitted.

As noted above, one potential drawback for systems that utilize such a PPDU structure, such as ultra-high reliability (UHR) systems, is a lack of a signaling mechanism to provide a NACK of the PPDU. For various reasons, a NACK for the PPDU might be beneficial, even when none of the MPDUs conveyed therein are successfully received. For example, a NACK for a PPDU may provide feedback to a transmitter, allowing the transmitter to adjust transmit parameters for subsequent transmissions. For example, a NACK may provide immediate feedback regarding channel conditions or interference experienced by the receiver. The transmitter may determine adjustments, based on the feedback and, in some cases, the feedback may include recommended adjustments.

Aspects of the present disclosure provide a signaling mechanism allowing a receiver to provide NACK feedback of a PPDU. Based on the feedback, a transmitter may be able to adjust transmit parameters for a subsequent PPDU (e.g., a subsequent PPDU contains retransmission of MPDUs and possibly additional MPDUs). The mechanisms proposed herein may also be used to provide NACK feedback for a null data packet (NDP) PPDU that does not contain a PSDU altogether. In this case the NPD PPDU may solicit a NACK frame (e.g., based on PHY header information) and the NACK frame may contains link adaptation (LA) parameters (e.g., MCS, NSS, BW, PPDU type, transmit power, target RSSI, subchannel availability, interference, puncturing information, and the like).

In some cases, a receiver may also be able to set a duration field in a frame used to signal a NACK that may allow a network allocation vector (NAV) to be expanded (e.g., even in the event it is not able to successfully decode a PPDU), which may allow sufficient time for the receiver to receive re-transmissions. For example, the duration field may be set to a value that indicates a duration based on a duration indicated in a TXOP field in a PHY header of the PPDU, a SIFS duration, and/or a duration to transmit the NACK frame (e.g., TXOP-SIFS-NACK transmission time).

In some cases, a NACK may be provided in a frame that also includes suggested adjustments to transmit parameters, such as bandwidth, a number of spatial streams (NSS), and/or a modulation and coding scheme (MCS) to use for the retransmission (e.g., and/or feedback regarding channel conditions/interference that may be used by the transmitter to adjust such parameters). Thus, the NACK signaling mechanisms provided herein may help adapt to changing channel conditions.

Figure 3:
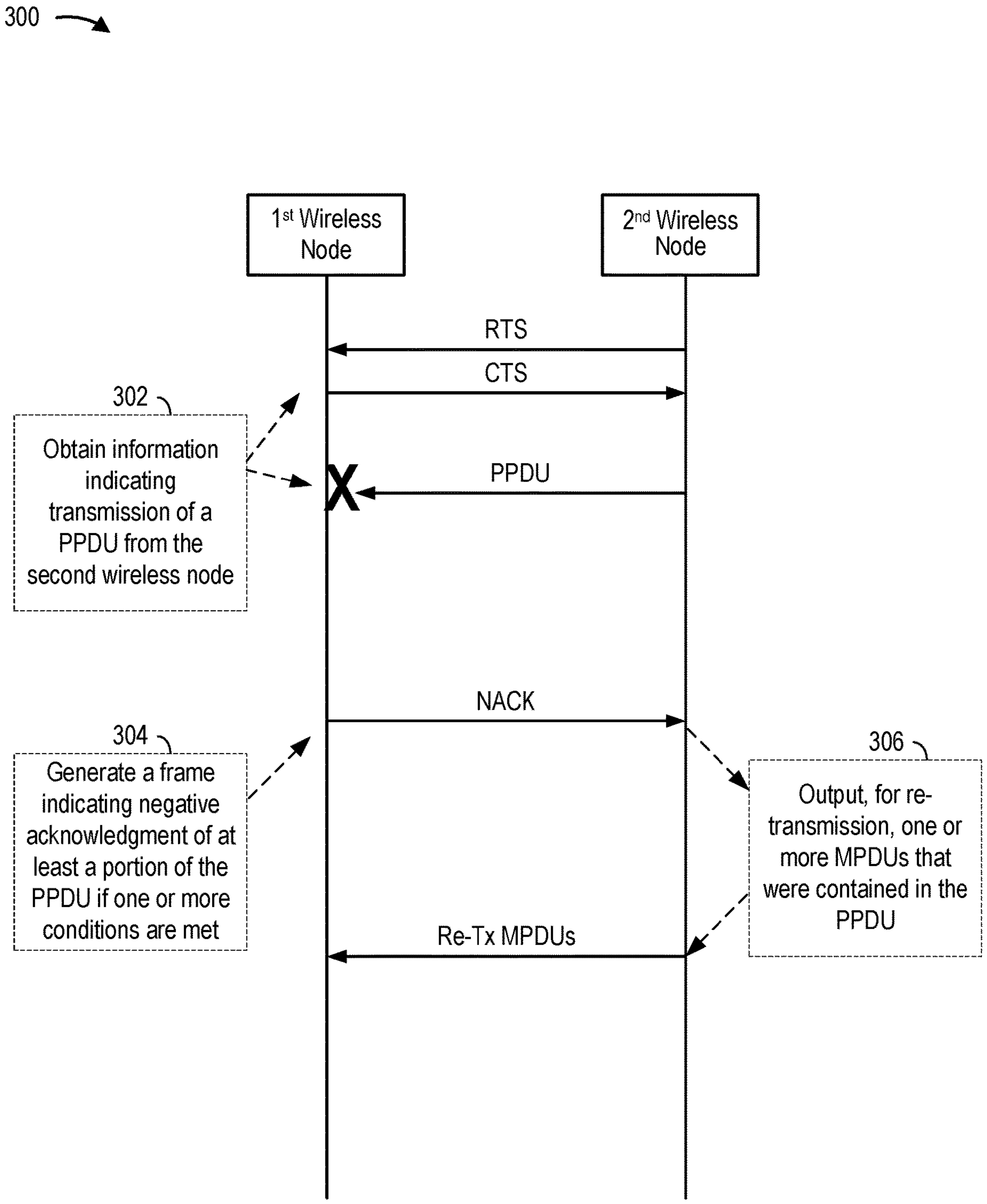
FIG. 3 shows an example call flow diagram for channel selection, in accordance with aspects of the present disclosure.

FIG. 3 depicts a call flow diagram 300 illustrating techniques for signaling a negative acknowledgment (NACK), in accordance with certain aspects of the present disclosure.

In some aspects, the first wireless node and/or the second wireless node shown in FIG. 3 may be examples of the AP 102 (e.g., an AP STA) and/or the STA 104 (e.g., a non-AP STA) depicted and described with respect to FIG. 1. For example, the first wireless node may be an AP and the second wireless node may be a STA, the first wireless node may be a STA and the second wireless node may be an AP, or both the first and second wireless nodes may be STAs in a peer-to-peer (P2P) scenario.

As indicated at 302, a first wireless node may obtain information indicating transmission of a PPDU from the second wireless node even though, as illustrated by the X, the first wireless node has not successfully decoded the PPDU.

The information may include various types of information that allows the first wireless node to ascertain that it was the intended recipient of the PPDU and to also ascertain the identity of the transmitter (e.g., the second wireless node). For example, the first wireless node may obtain the information from a previous frame exchange (e.g., the RTS and CTS illustrated in FIG. 3) or by decoding a physical layer (PHY) header of the PPDU.

As indicated at 304, the first wireless node may then generate a frame indicating negative acknowledgment (NACK) of at least a portion of the PPDU, if one or more conditions are met. Thus, the first wireless node may NACK the PPDU even if it does not successfully decode any MPDUs conveyed thereby.

As indicated at 306, after receiving the NACK frame, the second wireless node may output, for re-transmission, one or more MPDUs that were contained in the PPDU. In some cases, the MPDUs may be re-transmitted using suggested adjustments to transmit parameters indicated in the NACK frame.

Figure 4A:
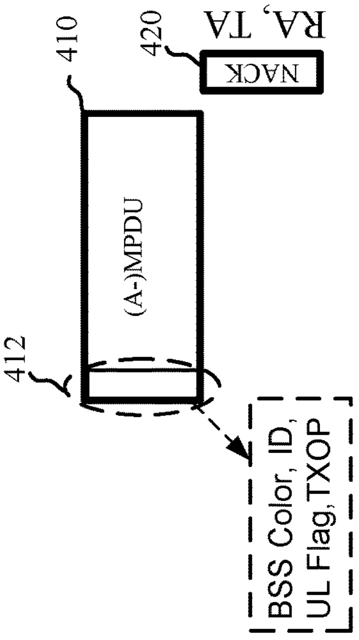
FIGS. 4A, 4B, and 4C show example signaling mechanisms for negatively acknowledging a PPDU, in accordance with aspects of the present disclosure.

FIG. 4A illustrates how a wireless node may obtain sufficient information to be able to generate a NACK frame 420 for a PPDU (or aggregated PPDU) 410 it did not successfully receive.

The exact type of information may depend on a type of the PPDU. For example, if the PPDU 410 is a high efficiency (HE) PPDU, a PHY header 412 may include various fields, such as a BSS Color field and an UL Flag that indicate a direction of the transmission. The BSS color may be non-unique (e.g., only 6 bits), so there may be a non-negligible likelihood of collisions between BSSs. Therefore, in addition to the BSS color field, a STA may use other fields to determine if a PPDU is intended for it.

The UL flag may be set to a first value (e.g., UL flag=1) to indicate UL transmissions or to a second value (e.g., UL flag=0) to indicate downlink or P2P (DL/P2P) transmissions. Depending on the value of the UL flag, the PHY header may include a receiver ID (e.g., RXID if the UL flag is set to DL) or a transmitter ID (e.g., TXID if the UL flag is set to UL). Thus, the UL flag may indicate a non-AP STA is the receiver if set to 0 (e.g., UL Flag=0 to indicate DL) or the UL flag may indicate an AP is the receiver if set to 1 (e.g., UL Flag=1 to indicate UL).

Figure 4B:
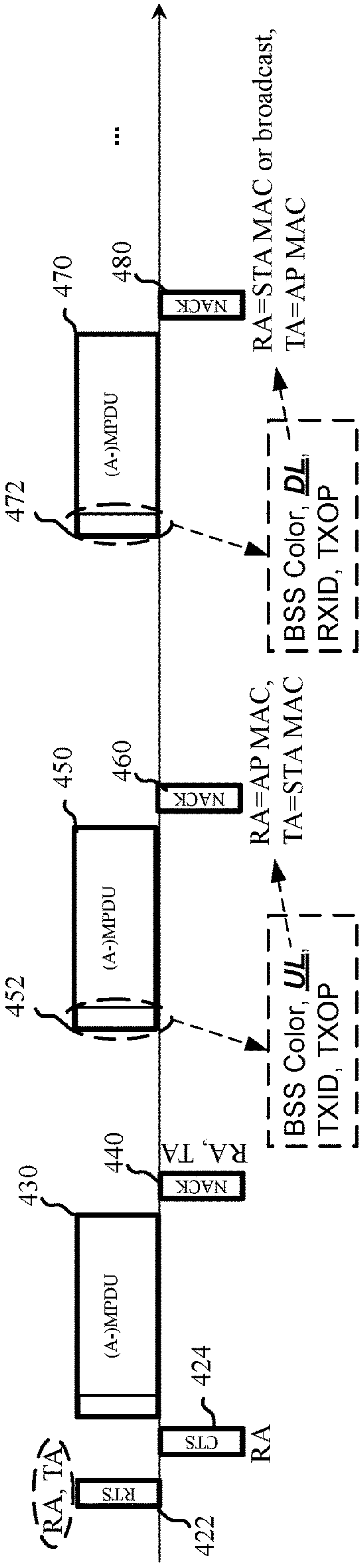

Other types of PPDUs, such as extreme high throughput (EHT) or ultra-high reliability (UHR) PPDUs, may have similar information as an HE MU PPDU. For example, UHR PPDUs may have a BSS Color field (e.g., of 6 bits), an UL Flag (1 bit), a RX/TX ID (e.g., of 11 bits) to identify the transmitter/receiver. The RX/TX ID may not be as unique as a receiver address (RA)/transmitter address (TA) conveyed in a previous frame exchange (e.g., an RTS/CTS exchange as shown in FIG. 4B). Therefore, additional mechanisms may be used to address potential non-uniqueness of receiver/ transmitter identifiers obtained from the fields in the PHY header/preamble. In some cases, a field that indicates a number of STAs in a SIG-B field may indicate whether a PPDU is multi-user (MU) or single user (SU).

As shown in FIG. 4A, the recipient can use this information to generate a NACK frame 420. As will be described in greater detail below, the NACK may be indicated in a new control frame, or via an existing type of control frame, such as a block acknowledgment (BA) frame, such as a compressed BA (C-BA) frame or Multi-STA BA (M-BA) frame.

Referring again to FIG. 4A, a wireless node that receives a PPDU (e.g., an UHR PPDU) with a PSDU failure (e.g., meaning no successfully received MPDUs) may check to see if one or more conditions are met before generating a NACK frame.

For example, the wireless node may first check the BSS color field to see if the PPDU was generated within its own BSS (e.g., check for a BSS color match). In some aspects, the wireless node may ignore PPDUs (and send no NACK) if there is no BSS color match.

The wireless node may also check whether the PPDU is UL or DL. For example, if the wireless node is an AP, then only UL PPDUs may be of interest (since these PPDUs are likely intended to the AP). Similarly, if the wireless node is a STA, then only DL (or P2P) PPDUs may be of interest (since these PPDUs are likely intended for the STA).

If the PPDU is an UL PPDU and the wireless node is an AP, then the AP may check which STA generated the PPDU (e.g., based on the transmitter (TX) identifier (ID)) to see if that STA is associated with the AP. If the PPDU is a DL PPDU and the wireless node is a STA, the STA may check if the PPDU was intended for it (e.g., based on the receiver (RX) ID).

If such conditions are met, then the wireless node may generate an immediate NACK frame. In some cases, a bit, e.g., an immediate response indication bit, in the PHY header of the PPDU may indicate that an immediate response is expected. In such cases, the wireless node may generate an immediate NACK frame, with immediate meaning after a short interframe space (SIFS) duration. In some cases, if there is no information in the PHY header to know if a response is expected, the wireless node may generate the NACK frame within a certain time period (e.g., after an AckTimeout or after an end of a TXOP). In some cases, a value of the TXOP field in (a PHY header of) the PPDU may indicate that an immediate response is expected (e.g., by setting this field to a value (e.g., 127) that is unspecified) to indicate TXOPs with immediate responses.

As noted above, in some cases, the NACK may be provided via a type of BA frame. For example, FIG. 5 illustrates an example multi-STA BA (M-BA) frame 500 that may be used to convey a NACK.

As illustrated, an M-BA may have a BA information field 502 that includes zero or more per association ID (AID) traffic ID (TID) Information fields 504. Each AID TID Information field may have fields for control information for given contexts for a particular TID and AID combination, referred to as a <TID, AID> tuple. For example, a BlockAck context may provide a BA bitmap 506 for a TID and intended for the (or from the) AID.

Figure 5:
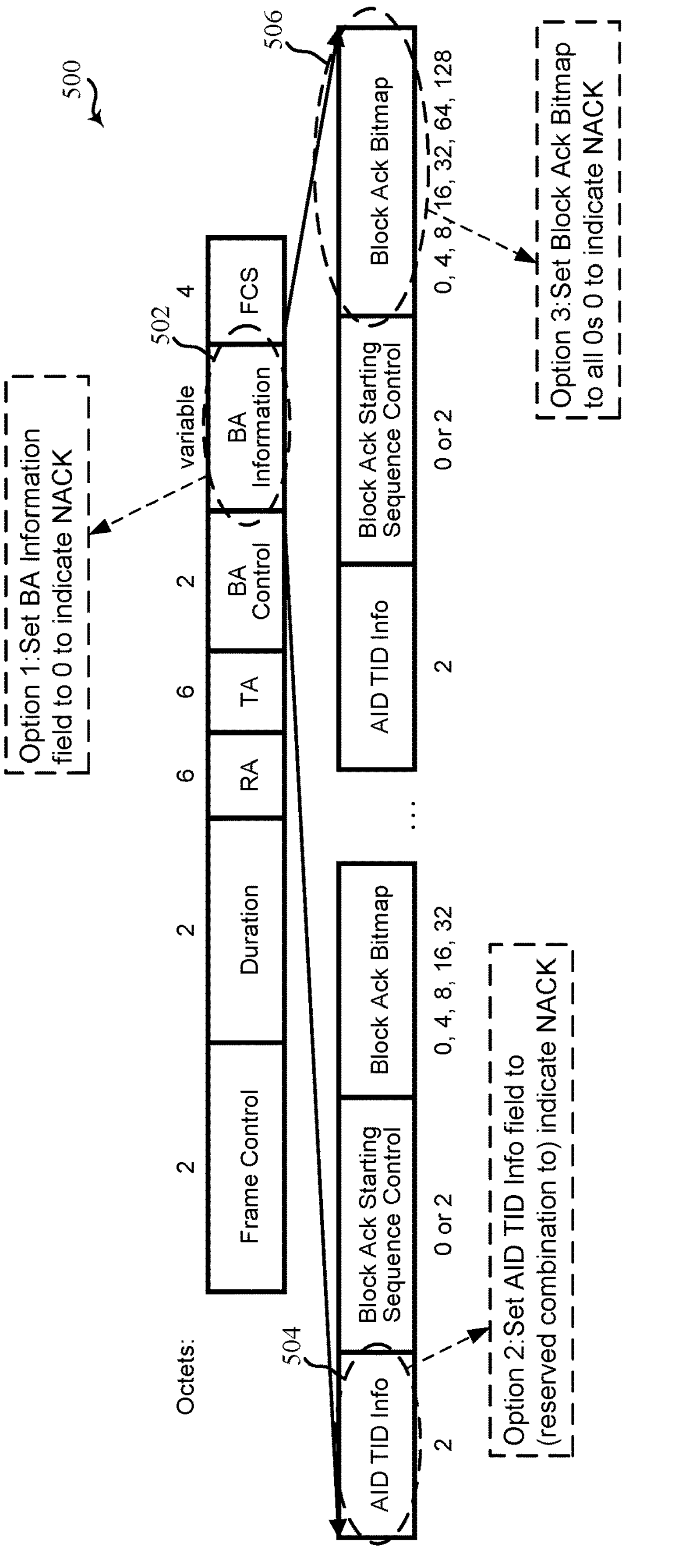
FIG. 5 shows an example frame format for negatively acknowledging a PPDU, in accordance with aspects of the present disclosure.

As illustrated in FIG. 5, there are various options for how a NACK may be indicated using an M-BA frame.

For example, according to a first option (Option 1), a NACK may be indicated by having the length of the BA Information field 502 equal to 0. In other words, setting the BA Information field to zero may indicate no BA Information is provided, which may be interpreted as meaning the M-BA frame is used as a NACK frame.

In such cases, the RA and TA fields of the M-BA may be set to identify the receiver and transmitter of the M-BA frame, respectively. This may be helpful, for example, when a preceding frame exchange provided the MAC addresses of the receiver (RA) and/or the transmitter (TA). One potential advantage associated with using an RA/TA from a previous frame exchange is that they will be available sooner than similar IDs obtained from PHY header IDs, which might not be ready prior to sending the M-BA. In some cases, if it is difficult to identify an RA prior to generating the M-BA frame, then this field may be set to broadcast. Of course, the transmitter address is always known to the transmitter. Upon receipt, the transmitter (of the PPDU) may be able to know that the M-BA is addressed to it, if the soliciting PPDU was generated by the transmitter and intended for the wireless node (STA) that is identified by address in TA of the M-BA.

According to a second option (Option 2), a NACK may be indicated by having a Per-AID TID Information field 504 that specifies a new context (e.g., Negative Ack). For example, this new context may be specified using a reserved combination of an Ack Type and TID subfields of the AID TID Info field. This would indicate a negative acknowledgment to/from the STA identified in the AID.

According to the second option (Option 2), a NACK may be indicated by having a Per-AID TID Information field with BlockAck Bitmap field 506 set to all 0s, for a TID and AID. In this case, the TID may be any TID and the AID may indicate the STA generating/receiving the BA.

Referring to FIG. 4B, if a previous frame exchange, such as an RTS 422 and CTS 424 or some other exchange is successful before an MPDU 430, the RA address can be obtained from the TA of the preceding frame in that TXOP. In the DL or UL case, the AID in the NACK 440 (e.g., an M-BA) may be the transmitting STA's AID or it could be 0 (e.g., for UL only). The AID may be equal to the RX/TX ID in the PHY header of preceding frame (e.g., so this RX/TX ID from the preceding frame may be reused as an AID in the M-BA).

As also illustrated in FIG. 4B, a wireless node may also rely only on a PHY header of a received PPDU. The TA address will be that of the transmitting STA, while the RA address may be that of the receiving STA (e.g., if found by the time the NACK is sent).

Referring to PPDU 450, if the UL flag of the PHY header 452 indicates an UL case (e.g., a STA is sending the NACK 460), the STA is only associated to one AP, so the RA address of NACK 460 is that of the AP (e.g., obtained as its MAC address). Referring to PPDU 470, if the UL flag of the PHY header 472 indicates a DL case (e.g., the AP is sending the NACK 480), there may be multiple STAs associated with the AP. So, there may be multiple stored RA addresses, hence it may take longer to get the MAC address. In such cases, the AP may decide to set the RA to broadcast.

In some cases, a response indication flag may be included in STA information fields of a SIG-B of a UHR MU PPDU. In such cases, each Response Indication field may tell a receiving STA (AID) that it is expected to generate an immediate response. This may be independent of the status of their MPDUs in the PSDU.

Different rules can be specified in such cases. For a multicast MU PPDU and a single control response, one STA Information field may specify an immediate response expected by one station (e.g., STA 1). In this case, the STA may generate the control response SIFS after (e.g., and the control response can be the NACK), which can be sent as a non-trigger-based (non-TB) PPDU format, since there is a single responder. Other STA Information fields may specify that no immediate responses are expected.

For a multicast MU PPDU and multiple control responses, multiple STA Information fields may specify immediate responses expected by STAs. In such cases, STAs may generate their control response a SIFS duration after (e.g., which can be the NACK). The control response should be sent in a TB PPDU format, with TX parameters that may have been previously indicated or using the same TX parameters as the soliciting MU PPDU (e.g., using same BW, RU allocation, MCS, and/or NSS).

When certain conditions occur, it may be possible that two STAs associated with two different APs generate a NACK in response to the same failed PPDU. For example, this may be possible when APs have the same BSS color (e.g., a collision avoidance protocol failed) and when STAs have the same AID and the UL Flag indicates an expected direction. For example, if the UL Flag indicates DL, then multiple STAs may respond at the same time, whereas if the UL Flag indicates UL, then multiple APs may respond at the same time. In some cases, the likelihood of this occurrence may be reduced by having APs randomize the AIDs of the STAs.

Two STAs associated with two different APs may also generate a NACK in response to the same failed PPDU, when none of the MPDUs or previous exchanges contain an RA/TA MAC address, which would resolve the collision problem. Two STAs associated with two different APs may also generate a NACK in response to the same failed PPDU, when all TX parameters of the PPDU are supported by both recipients, otherwise a recipient that does not support a TX parameter may not be expected to respond. Two STAs may generate a NACK in response to the same failed PPDU when one or more of the conditions described above are met and the Response Flag (or some other type of Immediate Response Indication) in the PPDU indicates that an immediate response is expected.

When multiple STAs transmit NACKs as described above, how the NACKs are handled may vary. In some cases, the STA that transmitted the PPDU may receive none of the two NACKs (e.g., destructive collision). In other cases, the STA that transmitted the PPDU may receive one of the two M-BAs (e.g., likely that of the peer STA since likely nearer).

According to certain aspects, once such a condition occurs or persists, then a STA transmitting the PPDU may disable the NACK feature by setting the Response Flag to indicate no immediate response is expected.

Figure 4C:
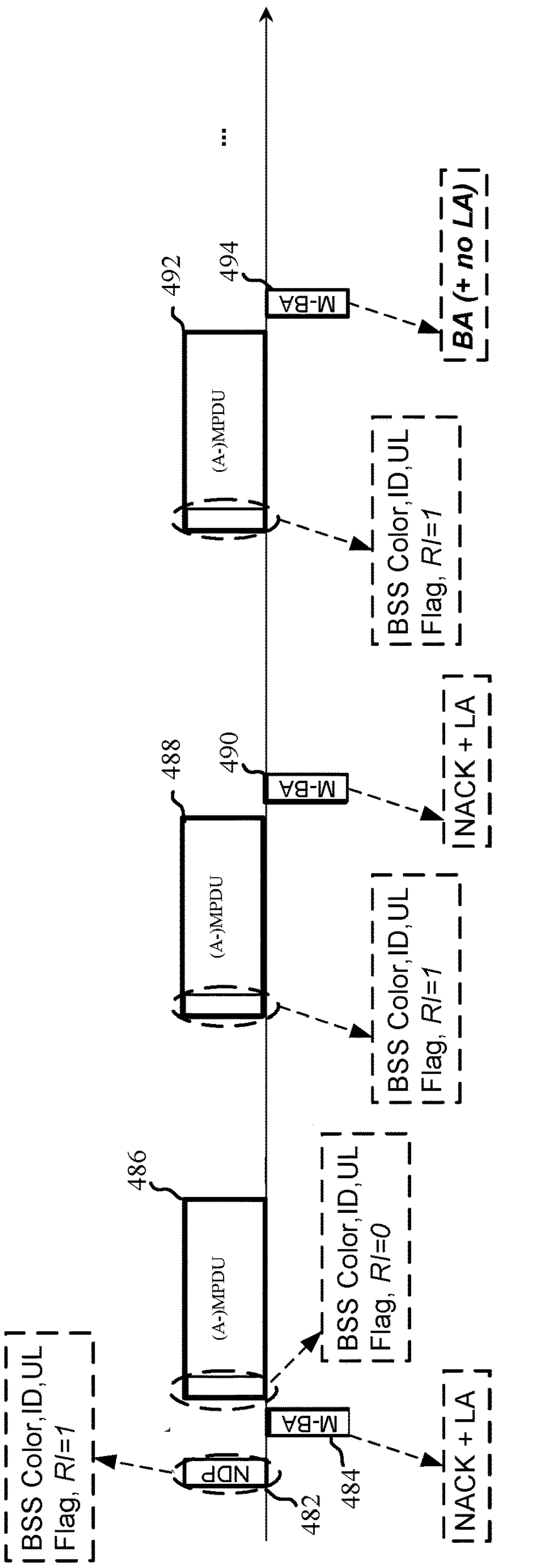

As illustrated in FIG. 4C, in some cases where the NACK is conveyed in an M-BA frame, recommended transmit parameters may be provided as link adaptation (LA) parameters in an additional field/subfield of the M-BA frame.

For example, as illustrated, an M-BA frame 484 used as a NACK frame (to NACK an NDP PPDU 482 that includes a flag set to solicit an immediate response, RI=1) may contain a field (e.g., a Control Feedback field) with the Link adaptation parameters. In some cases, the M-BA may have no Per-AID TID Information fields with BlockAck Bitmaps.

As illustrated, in response to the NACK/M-BA 484, the transmitter may transmit a PPDU 486 with one or more (A-) MPDUs. In this case, a PHY header of PPDU 486 does not solicit immediate feedback (RI=0). A subsequent PPDU 488, however, again solicits immediate feedback (RI=1) prompting an M-BA frame 490, again conveying a NACK and LA parameters. The LA parameters may be used to transmit another PPDU 492 which, in this example, is received resulting in an M-BA that provides a BA and no LA parameters.

In some cases, rules may dictate that, if the M-BA contains a Control Feedback field, then the transmitter needs to account for the feedback provided by the recipient in the Control Feedback field (e.g., to use the link adaptation parameters). Otherwise, if the M-BA does not contain a Control Feedback field, then the transmitter may be free to either use the previously used parameters (e.g., that were used in a preceding PPDU) or to adapt the parameters via other means (e.g., open loop link adaptation).

Providing identifiers in a PHY header, as indicated in FIGS. 4A, 4B, and 4C may have various benefits. For example, the identifiers in the PHY header may be beneficial when generation of protected BlockAck frames is required, such as in response to the PPDU containing that PHY header. The identifiers in the PHY header may allow for early identification of the transmitter/receiver and may help in retrieving security parameters, such as a temporary key (TK), a packet number (PN), and the like, which a STA may start retrieving as soon as the SIG-B check passes.

Providing identifiers in the PHY header may allow a STA to start preparing the protected BA after SIG-B passes. This may be especially useful when the STA is an AP that may store several TKs (e.g., PTKs, etc.) and independent PNs and may still be required to generate the BA, a SIFS time after. This may provide the STA an additional PSDU duration time to retrieve information.

In some cases, an additional bit may be provided in the PHY header to indicate that a protected BlockAck is expected in response.

As described herein, in certain cases, a STA that is the intended recipient of a PPDU that is not received, may be able to obtain sufficient information to generate a NACK for the PPDU.

Figure 6:
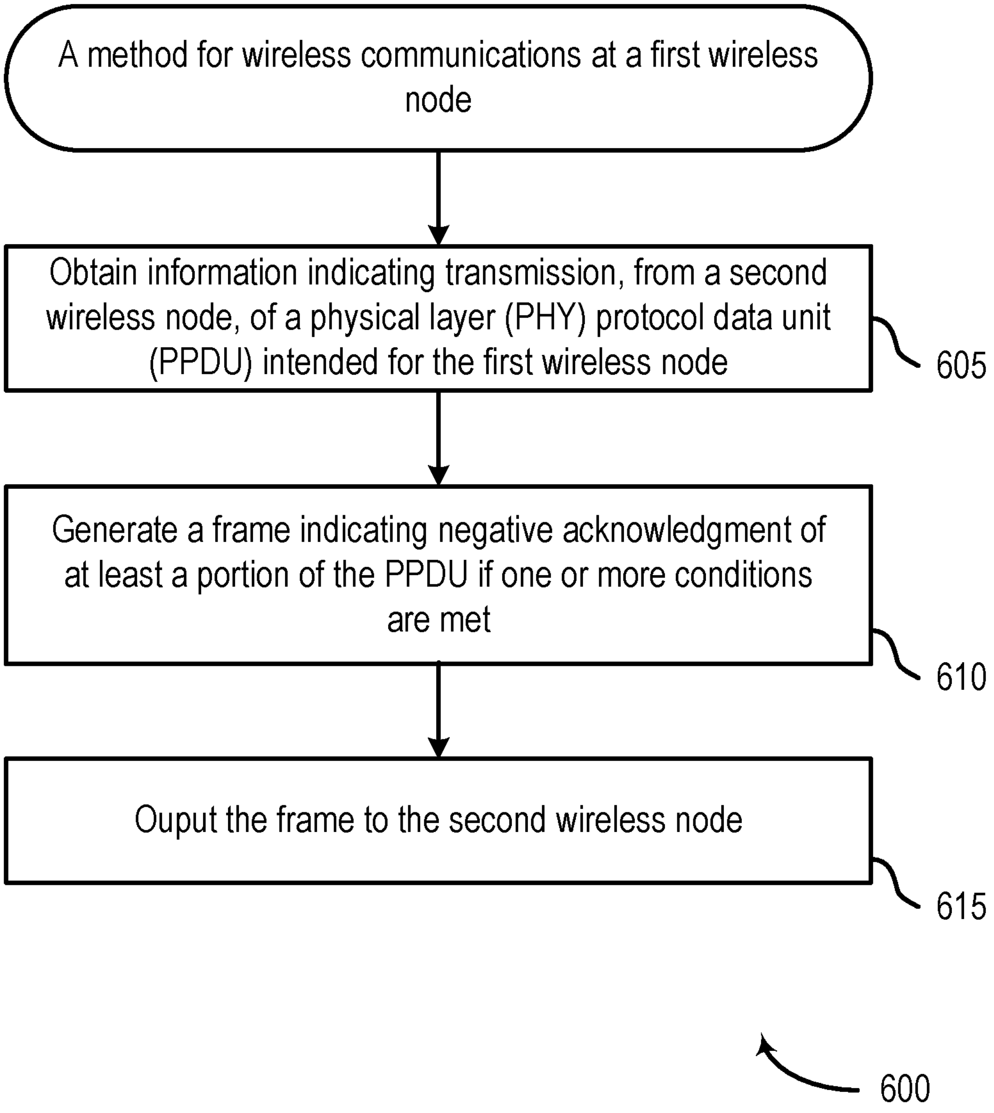
FIG. 6 shows a flowchart illustrating an example process performable at a first wireless device that supports signaling mechanisms for negative acknowledgment related to aspects of the present disclosure.

FIG. 6 shows a flowchart illustrating an example process 600 performable at a first wireless node, according to certain aspects of the present disclosure. The operations of the process 600 may be implemented by a wireless AP or a wireless STA, or its components as described herein. For example, the process 600 may be performed by a wireless communication device, such as the wireless communication device 800 described with reference to FIG. 8, operating as or within a wireless AP or a wireless STA. In some examples, the process 600 may be performed by a wireless AP or a wireless STA, such as one of the wireless APs 102 or one of the wireless STAs 104 described with reference to FIG. 1.

Process 600 begins at step 605 with obtaining information indicating transmission, from a second wireless node, of a physical layer (PHY) protocol data unit (PPDU) intended for the first wireless node.

Process 600 then proceeds to step 610 with generating a frame indicating negative acknowledgment of at least a portion of the PPDU if one or more conditions are met.

Process 600 then proceeds to step 615 with outputting the frame to the second wireless node.

In some aspects, at least one of the one or more conditions is considered met only if the first wireless node fails to decode a Physical layer convergence protocol (PLCP) Service Data Unit (PSDU) of the PPDU.

In some aspects, the information is obtained from at least one of: a physical (PHY) header of the PPDU; or a previous frame obtained from the second wireless node.

In some aspects, the information comprises at least one of: a basic service set (BSS) color value; a value of a flag indicating a direction type of the PPDU; a receiver identifier; or a transmitter identifier.

In some aspects, at least one of the receiver identifier or the transmitter identifier comprises a medium access control (MAC) address, an association identifier, or an identifier that is derived from the MAC address or the association identifier.

In some aspects, at least one of the one or more conditions is considered met if the BSS color value indicates the first wireless node and second wireless node belong to the same BSS or multiple BSSID set.

In some aspects, at least one of one or more conditions is considered met if: the value of the flag indicates an uplink direction if the first wireless node is an access point (AP); and the transmitter identifier indicates the second wireless node is associated with the AP.

In some aspects, at least one of the one or more conditions is considered met if: the value of the flag indicates a downlink direction if the first wireless node is a station (STA) or a peer-to-peer direction if the first wireless node is a STA; and the receiver identifier indicates the PPDU is intended for the STA.

In some aspects, at least one of the one or more conditions is considered met only if the first wireless node decodes at least a portion of a physical (PHY) header of the PPDU.

In some aspects, the at least one of the one or more conditions is considered met if the PPDU indicates a response is expected via: a bit in the PHY header of the PPDU; or a value of a transmit opportunity (TXOP) field in the PHY header.

In some aspects, the PPDU indicates the response is expected at, in, or during a short interframe space (SIFS) after an end of the PPDU.

In some aspects, the frame comprises a block acknowledgment (BA) frame, a trigger frame, or a clear to send (CTS) frame.

In some aspects, the BA frame has a BA information field set to a value that indicates a negative acknowledgment of the PPDU.

In some aspects, the BA frame has at least one association ID (AID) traffic ID (TID) information field set to a value that indicates a negative acknowledgment of the PPDU.

In some aspects, the BA frame has at least one association ID (AID) traffic ID (TID) information field with a BA bitmap subfield set to a value that indicates a negative acknowledgment of the PPDU.

In some aspects, the trigger frame: comprises a basic trigger frame or a multi-user (MU) request to send (RTS) trigger frame; and includes a set of transmit parameters for the second wireless node to use when retransmitting MAC Protocol Data Units (MPDUs) that were contained in the PPDU and a duration time within which retransmitted PPDUs should be sent.

In some aspects, the trigger frame is designed to trigger transmissions from one or more other wireless devices along with the first wireless node.

In some aspects, the frame includes a set of transmit parameters for the second wireless node to use when retransmitting MAC Protocol Data Units (MPDUs) that were contained in the PPDU.

In some aspects, the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

In some aspects, the frame includes a duration field that indicates a duration that is based on: a duration indicated in a transmit opportunity (TXOP) field in a physical (PHY) header of the PPDU; a duration of a short interframe space (SIFS); and a duration of the frame.

Figure 8:
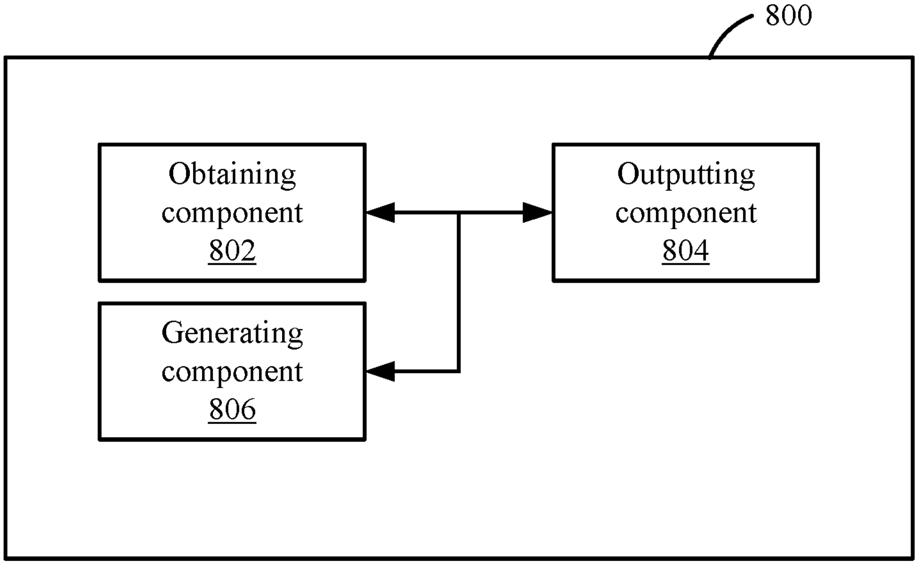
FIG. 8 shows a block diagram of an example wireless communication device that supports aspects of the present disclosure.

In one aspect, process 600, or any aspect related to it, may be performed by an apparatus, such as communications device 800 of FIG. 8, which includes various components operable, configured, or adapted to perform the process 600. Communications device 800 is described below in further detail.

Note that FIG. 6 is just one example of a method, and other methods including fewer, additional, or alternative steps are possible consistent with this disclosure.

Figure 7:
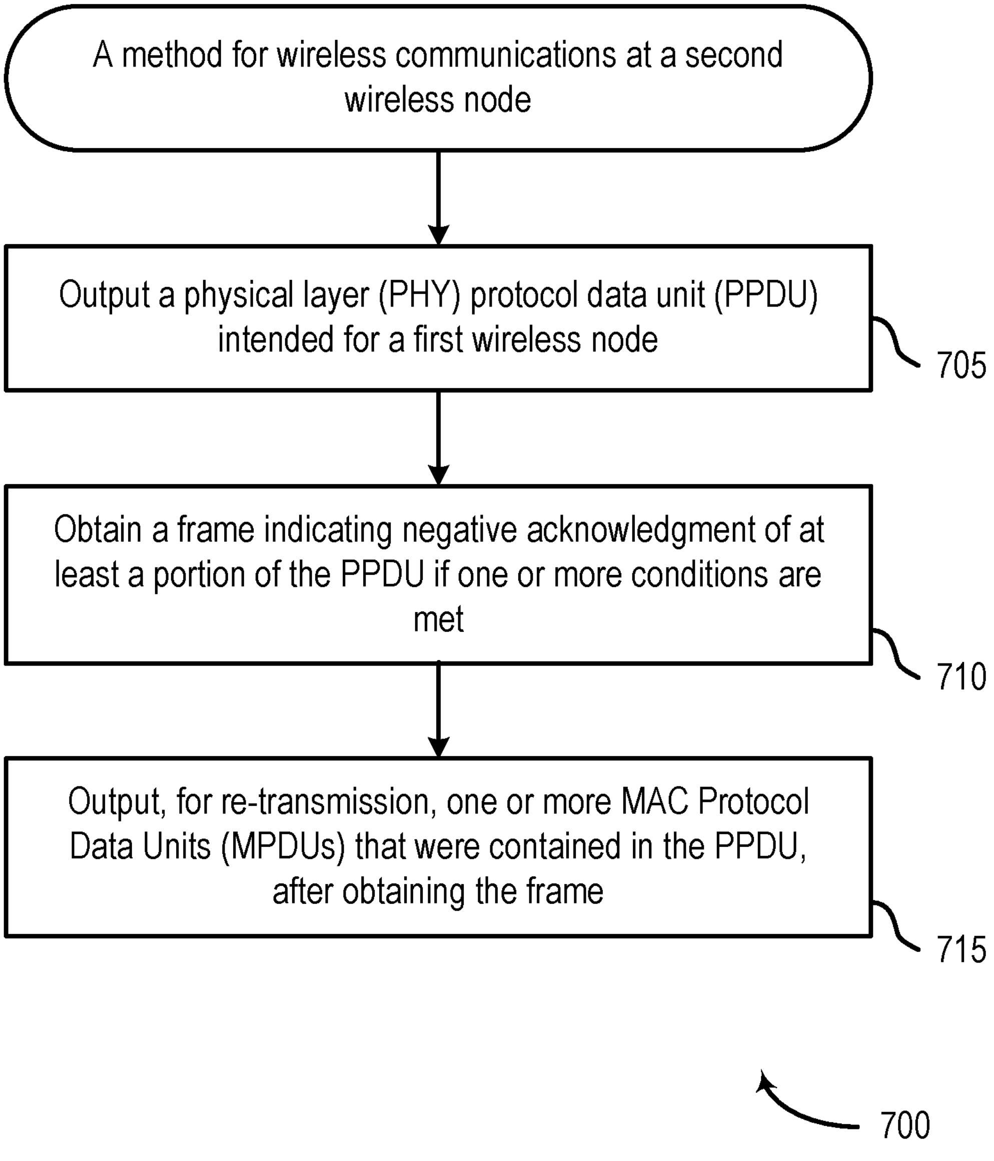
FIG. 7 shows a flowchart illustrating an example process performable at a second wireless device that supports signaling mechanisms for negative acknowledgment related to aspects of the present disclosure.

FIG. 7 shows a flowchart illustrating an example process 700 performable at a second wireless node, according to certain aspects of the present disclosure. The operations of the process 700 may be implemented by a wireless AP or a wireless STA, or its components as described herein. For example, the process 700 may be performed by a wireless communication device, such as the wireless communication device 800 described with reference to FIG. 8, operating as or within a wireless AP or a wireless STA. In some examples, the process 700 may be performed by a wireless AP or a wireless STA, such as one of the wireless APs 102 or one of the wireless STAs 104 described with reference to FIG. 1.

Process 700 begins at step 705 with outputting a physical layer (PHY) protocol data unit (PPDU) intended for a first wireless node.

Process 700 then proceeds to step 710 with obtaining a frame indicating negative acknowledgment of at least a portion of the PPDU if one or more conditions are met.

Process 700 then proceeds to step 715 with outputting, for re-transmission, one or more MAC Protocol Data Units (MPDUs) that were contained in the PPDU, after obtaining the frame.

In some aspects, the PPDU indicates a response to the PPDU is expected, wherein the indication comprises: a bit in a PHY header of the PPDU; or a value of a transmit opportunity (TXOP) field in the PHY header.

In some aspects, the PPDU indicates the response is expected at, in, or during a short interframe space (SIFS) after an end of the PPDU.

In some aspects, the frame comprises a block acknowledgment (BA) frame, a trigger frame, or a clear to send (CTS) frame.

In some aspects, the BA frame has a BA information field set to a value that indicates a negative acknowledgment of the PPDU.

In some aspects, the BA frame has at least one association ID (AID) traffic ID (TID) information field set to a value that indicates a negative acknowledgment of the PPDU.

In some aspects, the BA frame has at least one association ID (AID) traffic ID (TID) information field with a BA bitmap subfield set to a value that indicates a negative acknowledgment of the PPDU.

In some aspects, the frame includes a set of transmit parameters for the second wireless node to use when retransmitting one or more MAC Protocol Data Units (MPDUs) that were contained in the PPDU; and the one or more MPDUs are outputted for retransmission using at least some of the transmit parameters.

In some aspects, the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

In one aspect, process 700, or any aspect related to it, may be performed by an apparatus, such as communications device 800 of FIG. 8, which includes various components operable, configured, or adapted to perform the process 700. Communications device 800 is described below in further detail.

Note that FIG. 7 is just one example of a method, and other methods including fewer, additional, or alternative steps are possible consistent with this disclosure.

FIG. 8 shows a block diagram of an example wireless communication device 800 that supports techniques disclosed herein, such as techniques that enable a network entity to indicate recommendations, to a wireless station, for seamless roaming. In some examples, the wireless communication device 800 is configured to perform the process 600 described with reference to FIG. 6. In some examples, the wireless communication device 800 is configured to perform the process 700 described with reference to FIG. 7. The wireless communication device 800 may include one or more chips, SoCs, chipsets, packages, components or devices that individually or collectively constitute or comprise a processing system. The processing system may interface with other components of the wireless communication device 800, and may generally process information (such as inputs or signals) received from such other components and output information (such as outputs or signals) to such other components. In some aspects, an example chip may include a processing system, a first interface to output or transmit information and a second interface to receive or obtain information. For example, the first interface may refer to an interface between the processing system of the chip and a transmission component, such that the device 800 may transmit the information output from the chip. In such an example, the second interface may refer to an interface between the processing system of the chip and a reception component, such that the device 800 may receive information that is then passed to the processing system. In some such examples, the first interface also may obtain information, such as from the transmission component, and the second interface also may output information, such as to the reception component.

The processing system of the wireless communication device 800 includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

In some examples, the wireless communication device 800 can be configurable or configured for use in an AP or a STA, such as the AP 102 or the STA 104 described with reference to FIG. 1. In some other examples, the wireless communication device 800 can be an AP or a STA that includes such a processing system and other components including multiple antennas. The wireless communication device 800 is capable of transmitting and receiving wireless communications in the form of, for example, wireless packets. For example, the wireless communication device 800 can be configurable or configured to transmit and receive packets in the form of physical layer PPDUs and MPDUs conforming to one or more of the IEEE 802.11 family of wireless communication protocol standards. In some other examples, the wireless communication device 800 can be configurable or configured to transmit and receive signals and communications conforming to one or more 3GPP specifications including those for 5G NR or 6G. In some examples, the wireless communication device 800 also includes or can be coupled with one or more application processors which may be further coupled with one or more other memories. In some examples, the wireless communication device 800 further includes at least one external network interface coupled with the processing system that enables communication with a core network or backhaul network that enables the wireless communication device 800 to gain access to external networks including the Internet.

The wireless communication device 800 includes an obtaining component 802, an outputting component 804, and a generating component 806. Portions of one or more of the components 802, 804, and 806 may be implemented at least in part in hardware or firmware. For example, the obtaining component 802 may be implemented at least in part by a processor or a modem. In some examples, portions of one or more of the components 802, 804, and 806 may be implemented at least in part by a processor and software in the form of processor-executable code stored in a memory.

In some implementations, the processor may be a component of a processing system. A processing system may generally refer to a system or series of machines or components that receives inputs and processes the inputs to produce a set of outputs (which may be passed to other systems or components of, for example, the wireless communication device 800). For example, a processing system of the wireless communication device 800 may refer to a system including the various other components or subcomponents of the wireless communication device 800, such as the processor, or a transceiver, or a communications manager, or other components or combinations of components of the wireless communication device 800. The processing system of the wireless communication device 800 may interface with other components of the wireless communication device 800, and may process information received from other components (such as inputs or signals) or output information to other components. For example, a chip or modem of the wireless communication device 800 may include a processing system, a first interface to output information and a second interface to obtain information. In some implementations, the first interface may refer to an interface between the processing system of the chip or modem and a transmitter, such that the wireless communication device 800 may transmit information output from the chip or modem. In some implementations, the second interface may refer to an interface between the processing system of the chip or modem and a receiver, such that the wireless communication device 800 may obtain information or signal inputs, and the information may be passed to the processing system. A person having ordinary skill in the art will readily recognize that the first interface also may obtain information or signal inputs, and the second interface also may output information or signal outputs.

Example Clauses

Implementation examples are described in the following numbered clauses:

Clause 1: A method for wireless communications at a first wireless node, comprising: obtaining information indicating transmission, from a second wireless node, of a physical layer (PHY) protocol data unit (PPDU) intended for the first wireless node; generating a frame indicating negative acknowledgment of at least a portion of the PPDU if one or more conditions are met; and outputting the frame to the second wireless node.

Clause 2: The method of Clause 1, wherein at least one of the one or more conditions is considered met only if the first wireless node fails to decode a Physical layer convergence protocol (PLCP) Service Data Unit (PSDU) of the PPDU.

Clause 3: The method of any one of Clauses 1-2, wherein the information is obtained from at least one of: a physical (PHY) header of the PPDU; or a previous frame obtained from the second wireless node.

Clause 4: The method of Clause 3, wherein the information comprises at least one of: a basic service set (BSS) color value; a value of a flag indicating a direction type of the PPDU; a receiver identifier; or a transmitter identifier.

Clause 5: The method of Clause 4, wherein at least one of the receiver identifier or the transmitter identifier comprises a medium access control (MAC) address, an association identifier, or an identifier that is derived from the MAC address or the association identifier.

Clause 6: The method of Clause 4, wherein at least one of the one or more conditions is considered met if the BSS color value indicates the first wireless node and second wireless node belong to the same BSS or multiple BSSID set.

Clause 7: The method of Clause 4, wherein at least one of one or more conditions is considered met if: the value of the flag indicates an uplink direction if the first wireless node is an access point (AP); and the transmitter identifier indicates the second wireless node is associated with the AP.

Clause 8: The method of Clause 4, wherein at least one of the one or more conditions is considered met if: the value of the flag indicates a downlink direction if the first wireless node is a station (STA) or a peer-to-peer direction if the first wireless node is a STA; and the receiver identifier indicates the PPDU is intended for the STA.

Clause 9: The method of any one of Clauses 1-8, wherein at least one of the one or more conditions is considered met only if the first wireless node decodes at least a portion of a physical (PHY) header of the PPDU.

Clause 10: The method of Clause 9, wherein the at least one of the one or more conditions is considered met if the PPDU indicates a response is expected via: a bit in the PHY header of the PPDU; or a value of a transmit opportunity (TXOP) field in the PHY header.

Clause 11: The method of Clause 10, wherein the PPDU indicates the response is expected at, in, or during a short interframe space (SIFS) after an end of the PPDU.

Clause 12: The method of any one of Clauses 1-11, wherein the frame comprises a block acknowledgment (BA) frame, a trigger frame, or a clear to send (CTS) frame.

Clause 13: The method of Clause 12, wherein the BA frame has a BA information field set to a value that indicates a negative acknowledgment of the PPDU.

Clause 14: The method of Clause 12, wherein the BA frame has at least one association ID (AID) traffic ID (TID) information field set to a value that indicates a negative acknowledgment of the PPDU.

Clause 15: The method of Clause 12, wherein the BA frame has at least one association ID (AID) traffic ID (TID) information field with a BA bitmap subfield set to a value that indicates a negative acknowledgment of the PPDU.

Clause 16: The method of Clause 12, wherein the trigger frame: comprises a basic trigger frame or a multi-user (MU) request to send (RTS) trigger frame; and includes a set of transmit parameters for the second wireless node to use when retransmitting MAC Protocol Data Units (MPDUs) that were contained in the PPDU and a duration time within which retransmitted PPDUs should be sent.

Clause 17: The method of Clause 12, wherein the trigger frame is designed to trigger transmissions from one or more other wireless devices along with the first wireless node.

Clause 18: The method of any one of Clauses 1-17, wherein the frame includes a set of transmit parameters for the second wireless node to use when retransmitting MAC Protocol Data Units (MPDUs) that were contained in the PPDU.

Clause 19: The method of Clause 18, wherein the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

Clause 20: The method of any one of Clauses 1-19, wherein the frame includes a duration field that indicates a duration that is based on: a duration indicated in a transmit opportunity (TXOP) field in a physical (PHY) header of the PPDU; a duration of a short interframe space (SIFS); and a duration of the frame.

Clause 21: A method for wireless communications at a second wireless node, comprising: outputting a physical layer (PHY) protocol data unit (PPDU) intended for a first wireless node; obtaining a frame indicating negative acknowledgment of at least a portion of the PPDU if one or more conditions are met; and outputting, for re-transmission, one or more MAC Protocol Data Units (MPDUs) that were contained in the PPDU, after obtaining the frame.

Clause 22: The method of Clause 21, wherein the PPDU indicates a response to the PPDU is expected, wherein the indication comprises: a bit in a PHY header of the PPDU; or a value of a transmit opportunity (TXOP) field in the PHY header.

Clause 23: The method of Clause 22, wherein the PPDU indicates the response is expected at, in, or during a short interframe space (SIFS) after an end of the PPDU.

Clause 24: The method of any one of Clauses 21-23, wherein the frame comprises a block acknowledgment (BA) frame, a trigger frame, or a clear to send (CTS) frame.

Clause 25: The method of Clause 24, wherein the BA frame has a BA information field set to a value that indicates a negative acknowledgment of the PPDU.

Clause 26: The method of Clause 24, wherein the BA frame has at least one association ID (AID) traffic ID (TID) information field set to a value that indicates a negative acknowledgment of the PPDU.

Clause 27: The method of Clause 24, wherein the BA frame has at least one association ID (AID) traffic ID (TID) information field with a BA bitmap subfield set to a value that indicates a negative acknowledgment of the PPDU.

Clause 28: The method of any one of Clauses 21-27, wherein: the frame includes a set of transmit parameters for the second wireless node to use when retransmitting one or more MAC Protocol Data Units (MPDUs) that were contained in the PPDU; and the one or more MPDUs are outputted for retransmission using at least some of the transmit parameters.

Clause 29: The method of Clause 28, wherein the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

Clause 30: An apparatus, comprising: at least one memory comprising executable instructions; and at least one processor configured to execute the executable instructions and cause the apparatus to perform a method in accordance with any one of Clauses 1-29.

Clause 31: An apparatus, comprising means for performing a method in accordance with any one of Clauses 1-29.

Clause 32: A non-transitory computer-readable medium comprising executable instructions that, when executed by at least one processor of an apparatus, cause the apparatus to perform a method in accordance with any one of Clauses 1-29.

Clause 33: A computer program product embodied on a computer-readable storage medium comprising code for performing a method in accordance with any one of Clauses 1-29.

Clause 34: A wireless node, comprising: at least one transceiver; at least one memory comprising executable instructions; and at least one processor configured to execute the executable instructions and cause the apparatus to perform a method in accordance with any one of Clauses 1-20, wherein the at least one transceiver configured to receive the information and transmit the frame.

Clause 35: A wireless node, comprising: at least one transceiver; at least one memory comprising executable instructions; and at least one processor configured to execute the executable instructions and cause the apparatus to perform a method in accordance with any one of Clauses 21-29, wherein the at least one transceiver is configured to transmit the PPDU and receive the frame.

Additional Considerations

As used herein, the term "determine" or "determining" encompasses a wide variety of actions and, therefore, "determining" can include calculating, computing, processing, deriving, estimating, investigating, looking up (such as via looking up in a table, a database, or another data structure), inferring, ascertaining, or measuring, among other possibilities. Also, "determining" can include receiving (such as receiving information), accessing (such as accessing data stored in memory) or transmitting (such as transmitting information), among other possibilities. Additionally, "determining" can include resolving, selecting, obtaining, choosing, establishing and other such similar actions.

As used herein, a phrase referring to "at least one of" or "one or more of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b. Furthermore, as used herein, a phrase referring to "a" or "an" element refers to one or more of such elements acting individually or collectively to perform the recited function(s). Additionally, a "set" refers to one or more items, and a "subset" refers to less than a whole set, but non-empty.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Means for obtaining, means for outputting, and means for generating may comprise one or more processors, such as one or more of the processors described above with reference to FIG. 8.

As used herein, "based on" is intended to be interpreted in the inclusive sense, unless otherwise explicitly indicated. For example, "based on" may be used interchangeably with "based at least in part on," "associated with," "in association with," or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions, or information.

The various illustrative components, logic, logical blocks, modules, circuits, operations, and algorithm processes described in connection with the examples disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The invention claimed is:

1. An apparatus for wireless communication, comprising:
at least one transceiver;
at least one memory comprising computer-executable instructions; and
one or more processors configured to execute the computer-executable instructions and cause the apparatus to:
receive, via the at least one transceiver, at a first wireless node, information indicating transmission, from a second wireless node, of a physical layer (PHY) protocol data unit (PPDU) intended for the first wireless node;
generate a multiple station (Multi-STA) block acknowledgement (BA) frame indicating negative acknowledgment of at least a portion of the PPDU if one or more conditions are met; and
transmit, via the at least one transceiver, the Multi-STA BA frame to the second wireless node.

2. The apparatus of claim 1, wherein at least one of the one or more conditions is considered met only if the first wireless node fails to decode a Physical layer convergence protocol (PLCP) Service Data Unit (PSDU) of the PPDU.

3. The apparatus of claim 1, wherein the information is received from at least one of:
a physical (PHY) header of the PPDU; or
a previous frame received from the second wireless node.

4. The apparatus of claim 3, wherein the information comprises at least one of:
a basic service set (BSS) color value;
a value of a flag indicating a direction type of the PPDU;
a receiver identifier; or
a transmitter identifier.

5. The apparatus of claim 4, wherein at least one of the receiver identifier or the transmitter identifier comprises a medium access control (MAC) address, an association identifier, or an identifier that is derived from the MAC address or the association identifier.

6. The apparatus of claim 4, wherein at least one of the one or more conditions is considered met if the BSS color value indicates the first wireless node and second wireless node belong to the same BSS or multiple BSSID set.

7. The apparatus of claim 4, wherein at least one of one or more conditions is considered met if:
the value of the flag indicates an uplink direction if the first wireless node is an access point (AP); and
the transmitter identifier indicates the second wireless node is associated with the AP.

8. The apparatus of claim 4, wherein at least one of the one or more conditions is considered met if:
the value of the flag indicates a downlink direction if the first wireless node is a station (STA) or a peer-to-peer direction if the first wireless node is a STA; and
the receiver identifier indicates the PPDU is intended for the STA.

9. The apparatus of claim 1, wherein at least one of the one or more conditions is considered met only if the first wireless node decodes at least a portion of a physical (PHY) header of the PPDU.

10. The apparatus of claim 9, wherein the at least one of the one or more conditions is considered met if the PPDU indicates a response is expected via:
a bit in the PHY header of the PPDU; or
a value of a transmit opportunity (TXOP) field in the PHY header.

11. The apparatus of claim 10, wherein the PPDU indicates the response is expected at, in, or during a short interframe space (SIFS) after an end of the PPDU.

12. The apparatus of claim 1, wherein the Multi-STA BA frame has a BA information field set to a value that indicates a negative acknowledgment of the PPDU.

13. The apparatus of claim 1, wherein the Multi-STA BA frame has at least one of:
at least one association ID (AID) traffic ID (TID) information field set to a value that indicates a negative acknowledgment of the PPDU; or
at least one AID TID information field with a BA bitmap subfield set to a value that indicates a negative acknowledgment of the PPDU.

14. The apparatus of claim 1, wherein the Multi-STA BA frame includes a set of transmit parameters for the second wireless node to use when retransmitting MAC Protocol Data Units (MPDUs) that were contained in the PPDU.

15. The apparatus of claim 14, wherein the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

16. The apparatus of claim 1, wherein the Multi-STA BA frame includes a duration field that indicates a duration that is based on:
a duration indicated in a transmit opportunity (TXOP) field in a physical (PHY) header of the PPDU;
a duration of a short interframe space (SIFS); and
a duration of the Multi-STA BA frame.

17. The apparatus of claim 1, wherein the apparatus is configured as a wireless station.

18. An apparatus for wireless communication, comprising:

at least one transceiver;

at least one memory comprising computer-executable instructions; and one or more processors configured to execute the computer-executable instructions and cause the apparatus to:

transmit, via the at least one transceiver at a second wireless node, a physical layer (PHY) protocol data unit (PPDU) intended for a first wireless node;

receive, via the at least one transceiver, a multiple station (Multi-STA) block acknowledgement (BA) frame indicating negative acknowledgment of at least a portion of the PPDU if one or more conditions are met; and transmit, via the at least one transceiver, for re-transmission, one or more MAC Protocol Data Units (MPDUs) that were contained in the PPDU, after reception of the Multi-STA BA frame.

19. The apparatus of claim 18, wherein the PPDU indicates a response to the PPDU is expected, wherein the indication comprises:

a bit in a PHY header of the PPDU; or a value of a transmit opportunity (TXOP) field in the PHY header.

20. The apparatus of claim 19, wherein the PPDU indicates the response is expected at, in, or during a short interframe space (SIFS) after an end of the PPDU.

21. The apparatus of claim 18, wherein the Multi-STA BA frame has a BA information field set to a value that indicates a negative acknowledgment of the PPDU.

22. The apparatus of claim 18, wherein the Multi-STA BA frame has at least one of:

at least one association ID (AID) traffic ID (TID) information field set to a value that indicates a negative acknowledgment of the PPDU; or at least one association ID (AID) traffic ID (TID) information field with a BA bitmap subfield set to a value that indicates a negative acknowledgment of the PPDU.

23. The apparatus of claim 18, wherein:

the Multi-STA BA frame includes a set of transmit parameters for the second wireless node to use when retransmitting one or more MAC Protocol Data Units (MPDUs) that were contained in the PPDU; and the one or more MPDUs are retransmitted using at least some of the transmit parameters.

24. The apparatus of claim 23, wherein the transmit parameters include at least one of: a modulation and coding scheme (MCS), a number of spatial streams (NSS), a bandwidth (BW), a transmit power, a preamble puncture pattern, a PPDU type, a guard interval, a type of encoding, or a spatial reuse allowance.

25. The apparatus of claim 1, wherein the apparatus is configured as a wireless station.

26. A method for wireless communications at a first wireless node, receiving information indicating transmission, from a second wireless node, of a physical layer (PHY) protocol data unit (PPDU) intended for the first wireless node;

generating a multiple station (Multi-STA) block acknowledgement (BA) frame indicating negative acknowledgment of at least a portion of the PPDU if one or more conditions are met; and transmitting the Multi-STA BA frame to the second wireless node.

* * * * *